US009706571B2

(12) United States Patent
Gao

(10) Patent No.: US 9,706,571 B2
(45) Date of Patent: Jul. 11, 2017

(54) METHOD, DEVICE AND MODULE DEVICE FOR TRANSMITTING DATA VIA WIFI

(71) Applicants: Hisense Co., Ltd., Qingdao (CN); HISENSE USA CORPORATION, Suwanee, GA (US); Hisense International Co., Ltd., Qingdao (CN)

(72) Inventor: Tongqing Gao, Qingdao (CN)

(73) Assignees: HISENSE CO., LTD., Qingdao (CN); HISENSE USA CORPORATION, Suwanee (GE); HISENSE INTERNATIONAL CO., LTD., Qingdao (CN)

(*) Notice: Subject to any disclaimer, the term of this patent is extended or adjusted under 35 U.S.C. 154(b) by 187 days.

(21) Appl. No.: 14/663,522

(22) Filed: Mar. 20, 2015

(65) Prior Publication Data
US 2015/0271849 A1 Sep. 24, 2015

(30) Foreign Application Priority Data

Mar. 21, 2014 (CN) .......................... 2014 1 0133221

(51) Int. Cl.
| | |
|---|---|
| *H04W 74/04* | (2009.01) |
| *H04B 15/00* | (2006.01) |
| *H04L 12/28* | (2006.01) |
| *H04W 88/08* | (2009.01) |
| *H04W 84/12* | (2009.01) |

(52) U.S. Cl.
CPC ............ *H04W 74/04* (2013.01); *H04B 15/00* (2013.01); *H04L 12/2858* (2013.01); *H04W 88/08* (2013.01); *H04W 84/12* (2013.01)

(58) Field of Classification Search
CPC . H04B 15/00; H04L 12/2858; H04L 12/4604; H04W 74/04; H04W 84/12; H04W 88/08; H04W 84/04; H04W 88/06
USPC .......................................................... 370/338
See application file for complete search history.

(56) References Cited

U.S. PATENT DOCUMENTS

| | | | | |
|---|---|---|---|---|
| 7,478,173 B1 * | 1/2009 | Delco | ................. | H04L 12/2865 709/250 |
| 2003/0202486 A1 * | 10/2003 | Anton, Jr. | ......... | H04L 29/12009 370/329 |
| 2006/0029028 A1 * | 2/2006 | Kim | ..................... | H04W 84/12 370/338 |
| 2006/0146747 A1 * | 7/2006 | Shpak | ................... | H04W 88/08 370/328 |
| 2007/0189308 A1 * | 8/2007 | Tchigevsky | ......... | H04L 12/4625 370/396 |

(Continued)

*Primary Examiner* — Chi H Pham
*Assistant Examiner* — Robert Lopata
(74) *Attorney, Agent, or Firm* — Harness, Dickey & Pierce, P.L.C.

(57) ABSTRACT

The disclosure relates to the field of communication, and particularly to a method, master device and module device for transmitting data via Wifi. In the embodiments of the disclosure, a virtual wireless network interface card is arranged in the module device, thus the Wifi data is transmitted via the Ethernet interface card and the Ethernet bridge, so that a wireless network interface card of a master device may be shared by a plurality of module devices, and the interference will not occur between the Wifi data of different module devices since the wifi data between the master device and the module device is transmitted by wire.

10 Claims, 3 Drawing Sheets

(56) References Cited

U.S. PATENT DOCUMENTS

| | | | | |
|---|---|---|---|---|
| 2008/0320156 | A1* | 12/2008 | Chen | H04W 76/02 709/230 |
| 2013/0322335 | A1* | 12/2013 | Smith | G06Q 30/01 370/328 |
| 2014/0293936 | A1* | 10/2014 | Wang | H04L 12/4625 370/329 |

* cited by examiner

METHOD, DEVICE AND MODULE DEVICE FOR TRANSMITTING DATA VIA WIFI

CROSS-REFERENCE TO RELATED APPLICATION

This application claims the benefit and priority of Chinese Patent Application No. 201410133221.6 filed Mar. 21, 2014. The entire disclosure of the above application is incorporated herein by reference.

FIELD

The disclosure relates to the field of communication, and particularly to a method, device and module device for transmitting data via Wifi.

BACKGROUND

The function of Wifi (wireless fidelity) is an important function of the present electronic device. Because Wifi location, Wifi direct connection or miracast interworking functions are necessary on some electronic devices, and cannot be replaced by the Ethernet, each electronic device may have to have the WiFi function.

In order to enable each electronic device to surf the Internet using Wifi, in the prior art, each electronic device is usually provided with an independent physical Wifi device. However, interference may exist between Wifi devices due to the particularity of the Wifi device.

SUMMARY

A method for transmitting data via Wifi according to an embodiment of the present disclosure includes:

receiving, by a wireless network interface card of a first device, data related to a module device, and sending the data to a repeater of the first device, and sending, by the repeater, the data related to the module device to a corresponding module device.

Another method for transmitting data via Wifi according to an embodiment of the present disclosure includes:

sending, by a virtual wireless network interface card of a module device, data of the module device to an Ethernet interface card of the module device, sending, by the Ethernet interface card, the data of the module device to a repeater of a first device, so that a wireless network interface card of the first device acquires the data from the repeater and sends out the data.

A device for transmitting data via Wifi according to an embodiment of the present disclosure includes:

configured to receive data related to a module device from an outer network, and send the received data related to the module device to a wireless hotspot; and send data of the module device received from the wireless hotspot to the outer network;

a wireless hotspot configured to process the data related to the module device received from the wireless network interface card and send the processed data to an Ethernet bridge; and process the data of the module device received from the Ethernet bridge and send the processed data to the wireless network interface card; and an Ethernet bridge configured to receive the data related to the module device from the wireless hotspot and send the data to the module device; and receive the data from the module device, and send the data to the wireless hotspot.

A module device for transmitting data via Wifi according to an embodiment of the present disclosure includes:

a virtual wireless network interface card configured to send data of the module device to an Ethernet interface card, and receive data related to the module device sent from the Ethernet interface card; and an Ethernet interface card configured to receive the data of the module device from the virtual wireless network interface card and sent the data to the master device; and configured to receive the data related to the module device from the master device and send the data to the virtual wireless network interface card.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION OF THE EMBODIMENTS

The embodiment of the present disclosure discloses a method, master device and module device for transmitting data via Wifi (wireless fidelity), to implement that the module devices with no wireless network interface card share a wireless Wifi component of the master device so as to realize the purpose of receiving and sending Wifi data, and avoid the problem of interference existing between Wifi components of module devices in the existing technical solution.

The technical solution provided by the embodiments of the present disclosure is further described in detail below in combination with the accompanying drawings.

Figure 1:
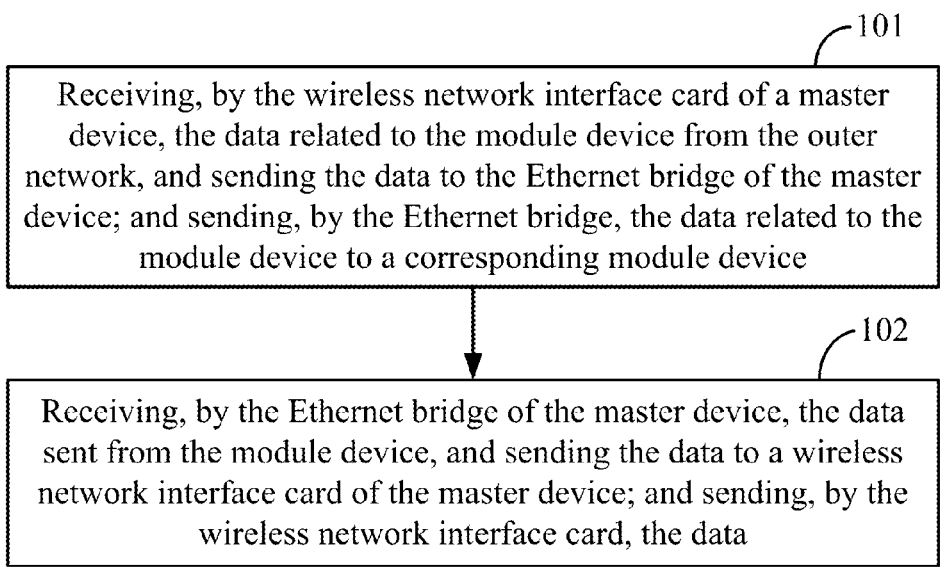
FIG. 1 is a flowchart of a method for transmitting data via Wifi according to an embodiment of the present disclosure.

FIG. 1 is a flowchart of a method for transmitting data via Wifi according to a first embodiment of the present disclosure, and the method includes:

Operation 101: receiving, by the wireless network interface card of a master device, the data related to the module device from the outer network, and sending the data to the Ethernet bridge of the master device, and sending, by the Ethernet bridge, the data related to the module device to a corresponding module device;

Operation 102: receiving, by the Ethernet bridge of the master device, the data sent from the module device, and sending the data to a wireless network interface card of the master device; and sending, by the wireless network interface card, the data.

The data sent by a module device is sent by the module device successively via the virtual wireless network interface card of the module device and the Ethernet interface card of the module device.

In the embodiment, operation 101 is an operation in which the master device sends the data related to the module device received via the wireless network interface card to the module device; operation 102 is an operation in which the master device sends the data from the module device via the wireless network interface card. No inevitable sequential relationship exists between the two operations, that is, if the master device receives the data sent by the module device at present, then it performs operation 102; if the master device receives the data related to the module device via the wireless internet card thereof at present, then it performs operation 101; if the master device receives the data sent by the module device and receives the data related to the module device via the wireless internet card simultaneously at present, then it performs operation 101 and operation 102 simultaneously. Therefore, which operation is performed specifically is determined according to the data received by the master device. What is mentioned here is only for the convenience of introduction. It does not represent that operation 102 must be performed after operation 101.

In the embodiment of the present disclosure, a virtual wireless network interface card is arranged in the module device, and the module device is connected to the master device via the Ethernet. When receiving the data from and sending data to the outer network, the master device receives and sends data directly via the wireless network interface card.

For the data sent to the module device, upon reception of the data related to the module device from the outer network, the wireless network interface card of the master device may send the data to the module device via the Ethernet bridge of the master device. After the module device receives the data via the Ethernet interface card thereof, the data is sent by the Ethernet interface card to the virtual wireless network interface card thereof, and received by the virtual wireless network interface card. Thus for the module device, data is actually still received via Wifi.

For the data needing to be sent by the module device, the virtual wireless network interface card of the module device sends the data to the Ethernet interface card, and to the master device via the Ethernet interface card. The master device sends the received data via the wireless network interface card thereof. Thus for the module device, data is actually sent via Wifi.

The introduction is made below respectively for different data transmission directions for the master device.

I. The master device sends data to the module device via the Ethernet bridge thereof:

The wireless network interface card of the master device receives the data related to the module device, and sends the data to the module device via the Ethernet bridge of the master device; the Ethernet interface card of the module device receives the data, and sends the data to the virtual wireless network interface card of the module device. Since the MAC (Media Access Control) address of the virtual wireless network interface card is contained in the data related to the module device which is received by the wireless network interface card of the master device, and the data needs to be sent via the Ethernet, it is necessary to encapsulate an MAC address of the Ethernet interface card for the data containing the MAC address of the virtual wireless network.

Particularly, the wireless network interface card of the master device receives the data containing the media access control (MAC) address of the virtual wireless network interface card; the wireless hotspot of the master device encapsulates the data containing the MAC address of the virtual wireless network interface card according to the MAC address of the Ethernet interface card, and sends the encapsulated data to the Ethernet bridge of the master device; the master device sends the encapsulated data to the Ethernet bridge of the master device; the master device sends the encapsulated data to the Ethernet interface card of the module device via the Ethernet bridge.

When encapsulating the data containing the MAC address of the virtual wireless network interface card, the master device encapsulates the MAC address of the Ethernet interface card of the module device in the frame header of the Ethernet frame, and sends it to the Ethernet interface card of the module device via the Ethernet bridge. The Ethernet interface card of the module device receives the Ethernet frame, and decapsulates the Ethernet frame to obtain the data containing the MAC address of the virtual wireless network interface card, and then transmits the data to the virtual wireless network interface card.

In an embodiment, the master device determines the MAC address of the Ethernet interface card corresponding to the MAC address of the virtual wireless network interface card in the data containing the MAC address of the virtual wireless network interface card according to the mapping relationship between the MAC address of the virtual wireless network interface card and the MAC address of the Ethernet interface card, and encapsulates the data containing the MAC address of the virtual wireless network interface card according to the determined MAC address of the Ethernet interface card, and sends the encapsulated data to the corresponding Ethernet interface card via the Ethernet bridge.

The mapping relationship between the MAC address of the virtual wireless network interface card and the MAC address of the Ethernet interface card may be stored in the wireless network interface card of the master device in the form of a mapping table or the like. Upon reception of the data containing the MAC address of the virtual wireless network interface card from the outer network, the wireless network interface card of the master device searches out the MAC address of the Ethernet interface card corresponding to the MAC address of the virtual wireless network interface card in the received data containing the MAC address of the virtual wireless network interface card from the mapping table of the MAC address of the virtual wireless card and the MAC address of the Ethernet interface card or other storage form capable of indicating the mapping relationship of the MAC address of the virtual wireless card and the MAC address of the Ethernet interface card, then encapsulates a corresponding MAC address of the Ethernet interface card into the frame header of the Ethernet frame, broadcasts the data containing the MAC address of the Ethernet interface card and the MAC address of the virtual wireless network interface card after encapsulation via the Ethernet bridge, so that the Ethernet interface cards of all the module devices connected with the Ethernet bridge can receive the data. Upon reception of the data containing the MAC address of the Ethernet interface card and the MAC address of the virtual wireless network interface card, the Ethernet interface card of the module device first determines whether the Ethernet frame header contains the MAC address of the Ethernet interface card corresponding to the Ethernet interface card itself, if no, the Ethernet interface card discards the data, and if yes, the Ethernet interface card decapsulates the received data into data containing the MAC address of the virtual wireless internet card and sent the data to the virtual wireless internet card.

In an embodiment, when forwarding the data of the module device, the master device may use another technical solution. The master device encapsulates the data containing the MAC address of the virtual wireless network interface card respectively according to the MAC address of each Ethernet interface card connected with the Ethernet bridge, and sends the each encapsulated data to corresponding Ethernet interface card connected with the Ethernet bridge via the Ethernet bridge according to the MAC address of the Ethernet interface card in the each encapsulated data.

Upon reception of the data containing the MAC address of the virtual wireless network interface card via the wireless network interface card, the master device, instead of using the MAC address of the Ethernet interface card of the module device to which its destination MAC address of the virtual wireless network interface card corresponds, first determines the MAC address of each Ethernet interface card connected with the Ethernet bridge of the master device, and then encapsulates each received data containing the MAC address of the virtual wireless network interface card respectively into data containing the MAC address of the Ethernet interface card and the MAC address of the virtual wireless network interface card according to the MAC address of each Ethernet interface card, and each time broadcasts the data after encapsulation to each Ethernet interface card connected with the Ethernet bridge. Upon reception of the data containing the MAC address of the Ethernet interface card and the MAC address of the virtual wireless network interface card, the Ethernet interface card of the module device first determines whether the MAC address of the Ethernet interface card corresponding to the Ethernet interface card itself is contained in the Ethernet frame header, if no, the Ethernet interface card discards the data, and if yes, the Ethernet interface card decapsulates the received data into data containing the MAC address of the virtual wireless internet card and sends the data to the virtual wireless internet card. At this time, the virtual wireless network interface card, for the received data containing the MAC address of the virtual wireless network interface card, re-determines whether the MAC address of the virtual wireless network interface card therein agrees with the MAC address of its own, if yes, the virtual wireless network interface card receives the data, or otherwise the virtual wireless network interface card discards the data.

II. The master device receives the data of the module device via the Ethernet bridge:

When the master device sends the data thorough the wireless network interface card, the data being sent from the module device to the master device successively via the virtual wireless network interface card, Ethernet interface card and Ethernet bridge, since the data received by the master device from the module device via the Ethernet bridge contains the MAC address of the Ethernet interface card and the MAC address of the virtual wireless network interface card, in order to send the data to the outer network via the wireless network interface card of the master device, the data containing the MAC address of the Ethernet interface card and the MAC address of the virtual wireless network interface card has to be decapsulated into the data only containing the MAC address of the virtual wireless network interface card.

Particularly, upon reception of the data containing the MAC address of the Ethernet interface card and the MAC address of the virtual wireless network interface card, which is sent by the module device via the virtual wireless network interface card and the Ethernet interface card, through the Ethernet bridge thereof, the master device decapsulates the data containing the MAC address of the Ethernet interface card and the MAC address of the virtual wireless network interface card, obtains data containing the MAC address of the virtual wireless network interface card, and sends the data via the wireless network interface card thereof.

The data of the module device is encapsulated by the virtual wireless network interface card, the MAC address of the virtual wireless network interface card is encapsulated into the frame header, and then forwarded via the Ethernet interface card. Before forwarding it, the Ethernet interface card further encapsulates it into data containing the MAC address of the Ethernet interface card and the MAC address of the virtual wireless network interface card to enable the data to be transmitted over the Ethernet. Upon reception of the data containing the MAC address of the Ethernet interface card and the MAC address of the virtual wireless network interface card, the Ethernet bridge of the master device has to remove the MAC address of the Ethernet interface card to enable the data to be sent to the outer network via the wireless network interface card, so the master device has to decapsulate the data containing the MAC address of the Ethernet interface card and the MAC address of the virtual wireless network interface card into the data only containing the MAC address of the virtual wireless network interface card.

In an embodiment, the Ethernet bridge of the master device may connect a plurality of Ethernet interface cards. Upon reception of the data sent to the module device by the outer network via the wireless network interface card, the master device sends the data related to a plurality of module devices from the outer network which is received via the wireless network interface card of the master device to the corresponding module device successively via the wireless multiplexer, the Ethernet bridge, Ethernet card and virtual wireless network interface card.

The master device sends the data, received via the Ethernet bridge and sent by the module device, to the wireless network interface card via a wireless multiplexer, and sends the data via the wireless network interface card, wherein the data sent by the module device is sent by the module device successively via the virtual wireless network interface card and the Ethernet interface card.

When the Ethernet bridge of the master device needs to connect a plurality of Ethernet interface cards, in order to enable a plurality of module devices to share the wireless network interface card of the master device, the master device has to use a wireless multiplexer to send the data of the module devices received via the wireless network interface card to the module devices and send out the data of the module devices received via the Ethernet bridge through the wireless network interface card. The implementation of the wireless multiplexer may be determined according to actual situation, and the implementing ways are all of the prior art, for which unnecessary details are no longer given here.

Figure 2:
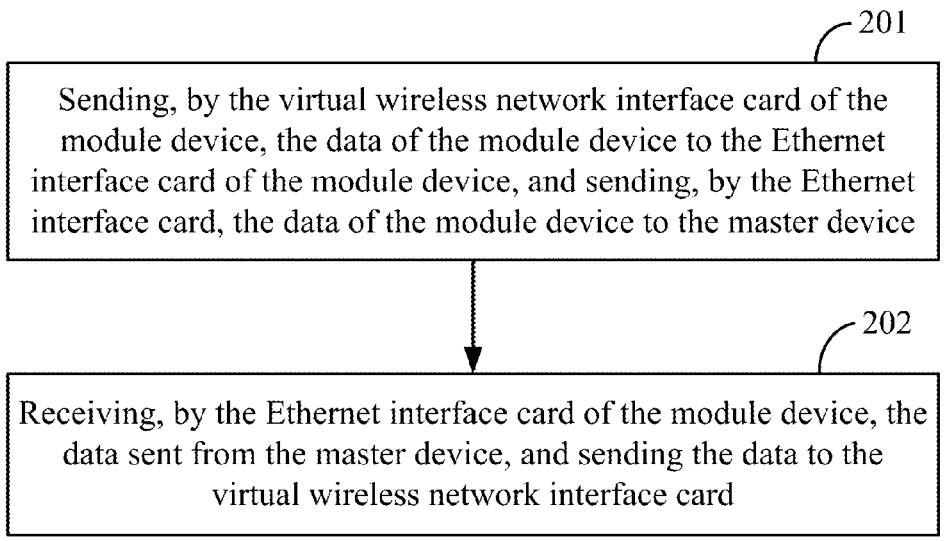
FIG. 2 is a flowchart of a method for transmitting data via Wifi according to another embodiment of the present disclosure.

FIG. 2 is a flowchart of a method for transmitting data via Wifi according to a second embodiment of the present disclosure, wherein the method includes:

Operation 201: sending, by the virtual wireless network interface card of the module device, the data of the module device to the Ethernet interface card of the module device, and sending, by the Ethernet interface card, the data of the module device to the master device;

Operation 202: receiving, by the Ethernet interface card of the module device, the data sent by the master device, and sending the data to the virtual wireless network interface card.

In the embodiment, operation 201 is an operation in which the module device sends the data of the module device to the outer network via the virtual wireless network interface card and the Ethernet interface card thereof and via the wireless network interface card of the master device; operation 202 is an operation in which the module device receives the data, which is received by the master device via the wireless network interface card, through the virtual wireless network interface card and the Ethernet interface card thereof. There is no inevitable sequential relationship between the two operations, that is, if the module device sends data to the outside presently via the wireless network interface card of the master device, then it performs operation 201; if the module device receives data presently via the virtual wireless network interface card and the Ethernet interface card, then it performs operation 202; if the master device sends data via the wireless network interface card of the master device and receives data via the virtual wireless network interface card and the Ethernet interface card simultaneously at present, then it performs operation 201 and operation 202 simultaneously. Therefore, which operation is performed specifically is determined according to the module device receiving or sending data. What is mentioned here is only for the convenience of introduction. It does not represent that operation 202 must be performed after operation 201.

For the data to be sent to the master device, the module device sends the data to the Ethernet interface card thereof via the virtual wireless network interface card thereof, and to the master device via the Ethernet interface card. The master device sends the received data via the wireless network interface card. Thus for the module device, data is actually sent via Wifi.

For the data sent by the master device, upon reception of the data related to the module device of the outer network, the master device may send the data to the Ethernet interface card of the module device via the Ethernet bridge thereof. For the module device, after receiving data via the Ethernet interface card thereof, it then receives data via the virtual wireless network interface card. Thus for the module device, data is actually received via Wifi.

In an implementation, wireless driver installation and wireless configuration may be made for the virtual wireless network interface card of the module device. The wireless configuration mainly includes Wifi protection configuration, proxy configuration, IP configuration and the like, and the wireless driver installation mainly is to install the virtual Wifi driven KO file in the kernel.

It needs to be noted that when the wireless driver installation and wireless configuration are made for the virtual wireless network interface card in the module device in the embodiments of the present disclosure, the method is not limited to the above way. Other ways allowing wirelessly driven installation and wireless configuration of the virtual wireless network interface card are all good for the embodiments of the present disclosure.

The introduction is made below respectively for different data sending directions for the module device.

I. The module device sends data to the master device via the Ethernet interface card:

The module device sends the data containing the MAC address of the Ethernet interface card and the MAC address of the virtual wireless network interface card to the master device via the virtual wireless network interface card and the Ethernet interface card, so that the master device receives the data via the Ethernet bridge and decapsulates the data into data containing the MAC address of the virtual wireless network interface card, and sends the data via the wireless network interface card.

In order to be able to send out the data in the Wifi form, the module device needs to encapsulate the data into data containing the MAC address of the virtual wireless network interface card via the virtual wireless network interface card. Additionally, in order to enable the Wifi data to be transmitted over the Ethernet, the module device needs to encapsulate the data containing the MAC address of the virtual wireless network interface card into data containing the MAC address of the Ethernet interface card and the MAC address of the virtual wireless network interface card via the Ethernet interface card. It is usually to encapsulate the data containing the MAC address of the virtual wireless network interface card into the Ethernet frame, and add a MAC address of the Ethernet interface card into the Ethernet frame header. Upon reception of the data containing MAC address of the Ethernet interface card and the MAC address of the virtual wireless network interface card via the Ethernet bridge, in order to send the data via the wireless network interface card, the master device needs to decapsulate the data containing the MAC address of the Ethernet interface card and the MAC address of the virtual wireless network interface card into the data only containing the MAC address of the virtual wireless network interface card.

II. The module device receives the data sent by the master device via the Ethernet interface card:

After the module device receives through the Ethernet interface card the data containing the MAC address of the Ethernet interface card and the MAC address of the virtual wireless network interface card sent by the master device via the wireless network interface card and the Ethernet bridge, the module device decapsulates the data into data containing the MAC address of the virtual wireless network interface card, which is received by the virtual wireless network interface card, and determines whether the MAC address of the virtual wireless network interface card in the data is the same as the MAC address of virtual wireless network interface card of the module device, determines that the reception is successful if yes, or otherwise discards the received data containing the MAC address of the virtual wireless network interface card; or After the module device receives through the Ethernet interface card the data containing the MAC address of the Ethernet interface card and the MAC address of the virtual wireless network interface card sent by the master device via the wireless network interface card and the Ethernet bridge, the module device judges whether the MAC address of the Ethernet interface card in the data is the same as the MAC address of the Ethernet interface card of the module device corresponds, if yes, decapsulates the data into data containing the MAC address of the virtual wireless network interface card, which is received by the virtual wireless network interface card, or otherwise discards the received data containing the MAC address of the Ethernet interface card and the MAC address of the virtual wireless network interface card.

There are two cases where the module device receives the data sent by the master device via the Ethernet interface card:

First Case: the master device encapsulates the MAC address of the Ethernet interface card into the header of the Ethernet frame according to the MAC address of the Ethernet interface card of the module device corresponding to the MAC address of virtual wireless network interface card in the data, which contains the MAC address of the virtual wireless network interface card and is received by the wireless network interface card, so that the data containing the MAC address of the virtual wireless network interface card is encapsulated into data containing the MAC address of the Ethernet interface card and the MAC address of the virtual wireless network interface card, wherein the mapping relationship between the MAC address of the virtual wireless network interface card and the MAC address of the Ethernet interface card has already stored in the master device, and then the master device broadcasts via the Ethernet bridge the mapping relationship to all of the Ethernet interface cards connected with the Ethernet bridge.

Accordingly, at this time, when the Ethernet interface card receives the data sent by the master device via the Ethernet bridge, as long as it is determined that the destination MAC address in the Ethernet frame header complies with the MAC address of its own, it can be determined that the received data is sent to the module device.

Second Case: Upon reception of the data containing the MAC address of the virtual wireless network interface card via the wireless network interface card, the master device, instead of being according to the MAC address of Ethernet interface card of the module device corresponding to its destination MAC address of the virtual wireless network interface card, first determines the MAC address of each Ethernet interface card connected with the Ethernet bridge of the master device, and then encapsulates the received data containing the MAC address of the virtual wireless network interface card respectively into data containing the MAC address of the Ethernet interface card and the MAC address of the virtual wireless network interface card according to the MAC address of each Ethernet interface card, and broadcasts each encapsulated data to corresponding Ethernet interface card connected with the Ethernet bridge.

Accordingly, when the Ethernet interface card receives the data sent by the master device via the Ethernet bridge, upon reception of the data containing the MAC address of the Ethernet interface card and the MAC address of the virtual wireless network interface card, the Ethernet interface card determines whether the Ethernet frame header contains the MAC address corresponding to the Ethernet interface card itself, if no, the Ethernet interface card discards the data, and if yes, the Ethernet interface card decapsulates the received data into data containing the MAC address of the virtual wireless internet card and sent it to the virtual wireless internet card. At this time, it cannot yet be determined that the data received by the Ethernet interface card must be transmitted to the module device. At this time, the virtual wireless network interface card, for the received data containing the MAC address of the virtual wireless network interface card, re-determines whether the MAC address of virtual wireless network interface card in the received data complies with the MAC address of its own, if yes, the virtual wireless network interface card receives the data, or otherwise discards the data.

The master device and module device in the embodiments of the present disclosure may be arranged within the same physical device, or may be a plurality of independently arranged physical devices. When the master device and module device are a plurality of independently arranged physical devices, the master device may be a TV set, and the module device may be a set-top box, a network player, a DVD player and the like.

Figure 3:
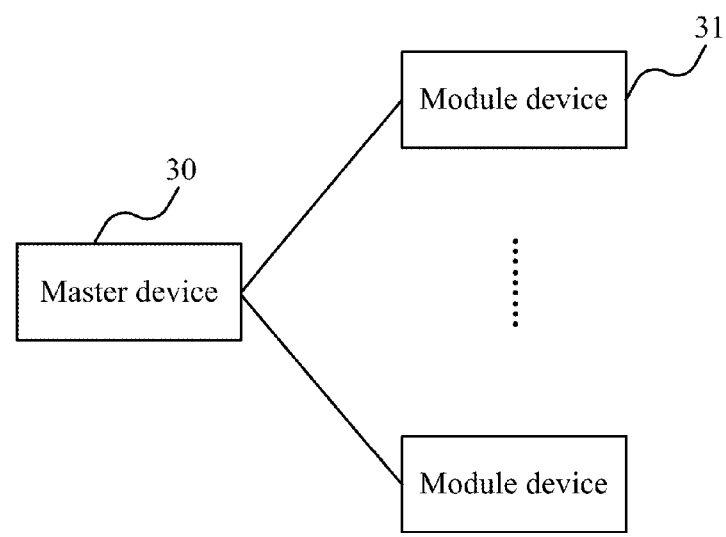
FIG. 3 is a schematic structural diagram of a system for transmitting data via Wifi according to an embodiment of the present disclosure.

FIG. 3 is a structural diagram of a system for transmitting data via Wifi according to a third embodiment of the present disclosure. The system in the embodiment of the present disclosure includes a master device 30 and at least one module device 31.

The master device 30 is configured to receive the data related to the module device via a wireless network interface card, and sending it to a corresponding module device via the Ethernet bridge thereof; and receive the data sent by the module device via the Ethernet bridge thereof, and send it via the wireless network interface card;

The module device 31 is configured to send the data of the module device successively via its virtual wireless network interface card and the Ethernet interface card; and receive successively via the Ethernet interface card and the virtual wireless network interface card the data sent by the master device.

The Ethernet interface card is arranged in the module device, and the wireless network card and the Ethernet bridge are arranged in the master device.

Based on the same inventive concept, the present disclosure also provides a master device for transmitting data via Wifi. Since the device corresponds to the method in the first embodiment of the present disclosure, and the above method is similar to the first embodiment in the principle of solving problems, the implementation of the above device may be referred to the implementation of the method, unnecessary details are no longer given herein for repeated ones.

Figure 4:
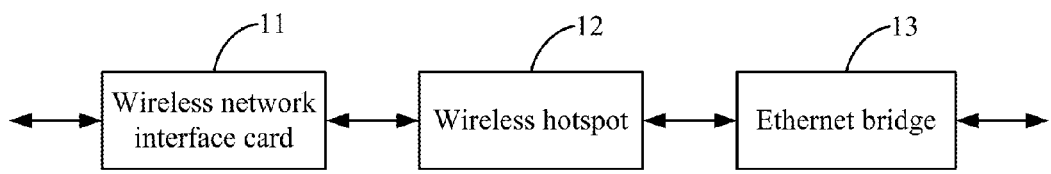
FIG. 4 is a schematic structural diagram of a master device in a system for transmitting data via Wifi according to an embodiment of the present disclosure.

FIG. 4 is a schematic structural diagram of a master device for transmitting data via Wifi according to a fourth embodiment of the present disclosure. The master device includes:

a wireless network interface card 11 is configured to receive the data related to the module device from the outer network, and send the received data related to the module device to a wireless hotspot 12; and configured to send the data of the module device received from the wireless hotspot 12 to the outer network;

a wireless hotspot 12 is configured to process the data related to the module device received from the wireless network interface card 11 and send it to an Ethernet bridge 13, and configured to process the data of the module device received from the Ethernet bridge 13 and send it to the wireless network interface card 11; and an Ethernet bridge 13 is configured to receive the data related to the module device from the wireless hotspot 12 and send the data to the module device; and to receive the data from the module device and send the data to the wireless hotspot 12.

The wireless network interface card of the master device is mainly configured to receive the data to be sent to the module device from the outer network and configured to send the data to be sent to the outer network from the module device. The wireless hotspot, for the data containing the MAC address of the virtual wireless network interface card which is sent to the module device by the wireless network interface card, encapsulates the data containing MAC address of the virtual wireless network interface card according to the MAC address of the Ethernet interface card, and send the encapsulated data to the Ethernet interface card via the Ethernet bridge, so that the corresponding module device receives the data containing the MAC address of the virtual wireless network interface card via the Ethernet interface card and the virtual wireless network interface card. The Ethernet bridge forwards the data.

In an embodiment, the wireless hotspot encapsulates the data containing the MAC address of the virtual wireless network interface card received from the wireless network interface card according to the MAC address of the Ethernet interface card, and sends it to the Ethernet bridge; and upon reception of the data of the module device containing the MAC address of the Ethernet interface card and the MAC address of the virtual wireless network interface card via the Ethernet bridge, the wireless hotspot decapsulates the data containing the MAC address of the Ethernet interface card and the MAC address of the virtual wireless network interface card received from the Ethernet bridge, obtains the data of the module device containing the MAC address of the virtual wireless network interface card and sends the data to the wireless network interface card.

In an embodiment, the wireless hotspot is configured to encapsulates data as follows:

The wireless hotspot is configured to determine the MAC address of the Ethernet interface card corresponding to the MAC address of the virtual wireless network interface card in the data containing the MAC address of the virtual wireless network interface card according to the mapping relationship between the MAC address of the virtual wireless network interface card and the MAC address of the Ethernet interface card, and encapsulate the data containing the MAC address of the virtual wireless network interface card according to the determined MAC address of the Ethernet interface card, and send the encapsulated data to the Ethernet bridge;

At this time, the Ethernet bridge is configured to:

send the received encapsulated data respectively to each of the Ethernet interface cards connected with the Ethernet bridge.

The mapping relationship between the MAC address of the virtual wireless network interface card and the MAC address of the Ethernet interface card may be stored in the wireless network interface card of the master device in the form of a mapping table or the like. Upon reception of the data containing the MAC address of the virtual wireless network interface card from the outer network by the wireless network interface card of the master device, the wireless hotspot searches out the MAC address of the Ethernet interface card corresponding to the MAC address of the virtual wireless network interface card in the received data containing the MAC address of the virtual wireless network interface card from the mapping table of the MAC address of the virtual wireless card and the MAC address of the Ethernet interface card or other storage form capable of indicating the mapping relationship of the MAC address of the virtual wireless card and the MAC address of the Ethernet interface card, then encapsulates a corresponding MAC address of the Ethernet interface card into the frame header of the Ethernet frame, broadcasts the data containing the MAC address of the Ethernet interface card and the MAC address of the virtual wireless network interface card after encapsulation via the Ethernet bridge, so that the Ethernet interface cards of all the module devices connected with the Ethernet bridge can receive the data. Upon reception of the data containing the MAC address of the Ethernet interface card and the MAC address of the virtual wireless network interface card, the Ethernet interface card of the module device first determines whether the Ethernet frame header contains the MAC address corresponding to the Ethernet interface card itself, if no, the Ethernet interface card discards the data, and if yes, the Ethernet interface card decapsulates the received data into data containing the MAC address of the virtual wireless internet card and sends it to the virtual wireless internet card.

In an embodiment, the wireless hotspot is configured to encapsulate data as follows:

The wireless hotspot is configured to encapsulate the data containing the MAC address of the virtual wireless network interface card respectively according to the MAC address of each Ethernet interface card connected with the Ethernet bridge, and send each encapsulated data to the Ethernet bridge according to the MAC address of the Ethernet interface card in the encapsulated data.

At this time, the Ethernet bridge is configured to:

sending each encapsulated data respectively to the Ethernet interface card corresponding to the MAC address of the Ethernet interface card in the each encapsulated data.

After the master device receives the data containing the MAC address of the virtual wireless network interface card via the wireless network interface card, the wireless hotspot, instead of being according to the MAC address of the Ethernet interface card of the module device corresponding to its destination MAC address of the virtual wireless network interface card, first determines the MAC address of each Ethernet interface card connected with the Ethernet bridge of the master device, and then encapsulates each received data containing the MAC address of virtual wireless network interface card into data containing the MAC address of the Ethernet interface card and the MAC address of the virtual wireless network interface card according to the MAC address of each Ethernet interface card, and broadcasts the encapsulated data to each Ethernet interface card connected with the Ethernet bridge for each time. Upon reception of the data containing the MAC address of the Ethernet interface card and the MAC address of the virtual wireless network interface card, the Ethernet interface card of the module device first determines whether the Ethernet frame header contains the MAC address of the Ethernet interface card itself, if no, the Ethernet interface card discards the data, and if yes, the Ethernet interface card decapsulates the received data into data containing the MAC address of the virtual wireless internet card and sends the data to the virtual wireless internet card. At this time, the virtual wireless network interface card, for the received data containing the MAC address of the virtual wireless network interface card, re-determines whether the MAC address of the virtual wireless network interface card therein complies with the MAC address of its own, if yes, the virtual wireless network interface card receives the data, or otherwise discards the data.

When the Ethernet bridge of the master device is connected with the Ethernet interface cards of a plurality of module devices, in order to enable the wireless network interface card of the master device to be shared, it is necessary to transmit data via a wireless multiplexer in the case of limited channels.

Figure 5:
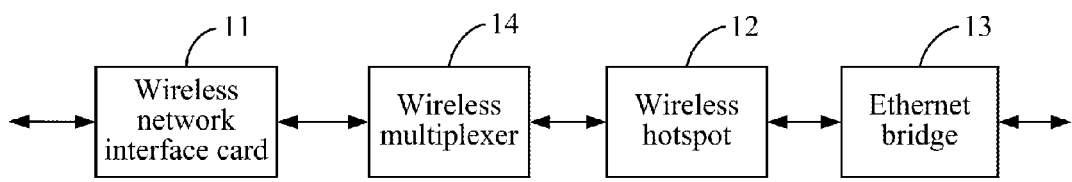
FIG. 5 is a schematic structural diagram of a master device in a system for transmitting data via Wifi according to another embodiment of the present disclosure.

In an embodiment, as shown in FIG. 5, a fifth embodiment of the present disclosure discloses a master device for transmitting data via Wifi. The master device further includes:

a wireless multiplexer 14 configured to send the data of a plurality of module devices received by the wireless network interface card 11 to a wireless hotspot 12; and send the data of a plurality of module devices received from the wireless hotspot 12 to the wireless network interface card 11.

The wireless multiplexer of the master device may be time division multiplexing, code division multiplexing and the like for implementation. Which multiplexing will be used may be determined according to actual situation. The wireless multiplexer reads and writes data in a time division mode from/into a plurality of device modules by polling.

Based on the same inventive concept, the embodiment of the present disclosure also provide a module device for transmitting data via Wifi. Since the device corresponds to the method of the second embodiment of the present disclosure, and the above method is similar to the second embodiment in the principle of solving problems, the implementation of the above device may be referred to the implementation of the method, unnecessary details are no longer given herein for repeated ones.

Figure 6:
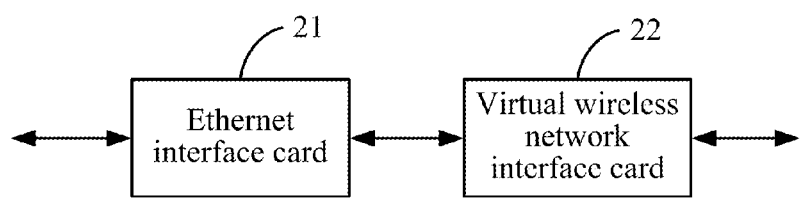
FIG. 6 is a schematic structural diagram of a module device in a system for transmitting data via Wifi according to an embodiment of the present disclosure.

FIG. 6 is a structural diagram of a module device for transmitting data via Wifi according to a sixth embodiment of the present disclosure. The module device includes:

a virtual wireless network interface card 22 is configured to send the data of the module device to an Ethernet interface card 21; and receive the data related to the module device sent from the Ethernet interface card 21; and an Ethernet interface card 21 is configured to receive the data of the module device sent from the virtual wireless network interface card 22 and send the data to the master device; and receive the data related to the module device sent from the master device and send the data to the virtual wireless network interface card 22.

The wireless configuration and wireless driver of the module device are both based on the virtual wireless network interface card. The details are determined according to the actual situation. The Ethernet interface card is a data interface of the module device with outside, and the module device receives and sends data via the Ethernet interface card.

In an embodiment, the Ethernet interface card is configured to:

encapsulate the data containing the MAC address of the virtual wireless network interface card received from the virtual wireless network interface card, send the encapsulated data containing the MAC address of the Ethernet interface card and the MAC address of the virtual wireless network interface card to the Ethernet bridge of the master device; and decapsulate the data containing the MAC address of the Ethernet interface card and the MAC address of the virtual wireless network interface card received from the Ethernet bridge of the master device, and send the decapsulated data containing MAC address of the virtual wireless network interface card to the virtual wireless network interface card.

In an embodiment, the Ethernet interface card is configured to:

receive the data containing the MAC address of Ethernet interface card and the MAC address of the virtual wireless network interface card sent from the master device, determining whether the MAC address of the Ethernet interface card in the data is the same as the MAC address itself, if yes, decapsulate the data and send the encapsulated data containing the MAC address of the virtual wireless network interface card to the virtual wireless network interface card, or otherwise discard the received data containing the MAC address of the Ethernet interface card and the MAC address of the virtual wireless network interface card.

The virtual wireless network interface card is configured to:

encapsulate the data of the module device into the data containing the MAC address of the wireless network interface card and then send the data to the Ethernet interface card; and receive the data containing the MAC address of the virtual wireless network car sent from the Ethernet interface card.

In an embodiment, the Ethernet interface card is configured to:

Upon reception of the data containing the MAC address of the Ethernet interface card and the MAC address of the virtual wireless network interface card sent from the master device, decapsulate the data into data containing the MAC address of the virtual wireless network interface card and send the data to the virtual wireless network interface card;

the virtual wireless network interface card is configured to:

encapsulate the data of the module device into data containing the MAC address of the virtual wireless network interface card and then send the data to the Ethernet interface card; and upon reception of the data containing the MAC address of the virtual wireless network interface card sent from the Ethernet interface card, judging whether the MAC address of the virtual wireless network interface card in the data containing the MAC address of the virtual wireless network interface card is the same as the MAC address of the virtual wireless network interface card itself, determine that the reception is successful if yes, or otherwise discard the received data containing the MAC address of the virtual wireless network interface card.

Optionally, for the master device and the module device in the above embodiments of the present disclosure, the master device and the module device may constitute a composite device, the master device may be a device in the composite device, which controls the core function, such as display and the like, and/or controls the main external device, such as USB/sdcard/Bluetooth/TVtuner/HDMI/AV or other device; the module device may be a device in the composite device, which implements a certain function, such as dedicated function or smart function and the like (for example digital television function, network set-top box function and routing function and the like).

It can be seen from the above content, the embodiment of the present disclosure provides a virtual wireless network interface card and an Ethernet bridge in the master device, and provides an Ethernet interface card and arranges a virtual wireless network interface card in the module device. When the module device receives Wifi data, the wireless network interface card of the master device transmits the Wifi data received from the outer network to the Ethernet interface card of the module device via the Ethernet bridge, and then the module device receives the data by the Ethernet interface card and the virtual wireless network interface card from the Ethernet bridge of the master device received; when the module device sends Wifi data, the module device encapsulates the data into Wifi data via the virtual wireless network interface card, and then transmits the data to the Ethernet bridge of the master device via the Ethernet interface card, and the master device finally sends the data of the module device received by the Ethernet bridge to the outer network via the wireless network interface card. The above technical solution enables module devices to share the Wifi components on the master device to implement Wifi connection. The embodiments of the disclosure are to transmit Wifi data via the Ethernet interface card and the Ethernet bridge by arranging a virtual wireless network interface card on the module device, so that it can be implemented that a wireless network interface card of the master device is shared by a plurality of module devices, and no interference will occur between Wifi data of the different module devices since the Wifi data between the master device and the module device is transmitted by wire.

Those skilled in the art should appreciate that embodiments of the present disclosure may be provided as a method, a system, or a computer program product. Accordingly, the present disclosure may take the form of an entire hardware embodiment.

The present disclosure is described with reference to the method of embodiments of the present disclosure, apparatus (systems), and the flowchart and/or block diagrams of computer program products.

It should be understood that each process and/or block in a flowchart and/or block diagram, and combination of the processes and/or blocks in a flowchart and/or block diagram can be realized by computer program instructions.

These computer program instructions may be provided to a general purpose computer, special purpose computer, embedded processor or other programmable data processing apparatus to produce a machine, such that the instructions executed by a computer or other programmable data processing apparatus generate the apparatus for implementing the specified functions in the flowchart of a process or a plurality of processes and/or a block diagram of a block or a plurality of blocks.

These computer program instructions may also be stored in a computer-readable memory that can direct a computer or other programmable data processing apparatus to work in a specific manner, such that the instructions stored in the computer-readable memory produce an article of manufacture including instruction means, and the instruction means implements the functions specified in the flow chart of a process or a plurality of processes and/or block diagram of a block or a plurality of blocks.

These computer program instructions may also be loaded onto a computer or other programmable data processing apparatus, so that a series of operations are executed on the computer or other programmable apparatus to produce the processing implemented by the computer, thus the instructions executed on a computer or other programmable apparatus provide the operations for implementing the function specified in the flowchart of one process or a plurality of processes and/or the block diagram of one block or a plurality of blocks.

Although the preferred embodiment of the present disclosure has been described, once those skilled in the art have learned the basic creative concepts, additional variations and modifications can be made to these embodiments. Therefore, the appended claims are intended to be construed as including the preferred embodiments and all the changes and modifications that fall within the scope of the present disclosure.

Obviously, various changes and variations can be made by the person skilled in the art without departing from the spirit and scope of the present disclosure. Thus if these changes and variations to the present disclosure belong to the claims of the disclosure and the scope of the technical equivalents, the present disclosure is also intended to include these changes and modifications.

The invention claimed is:

1. A method for transmitting data via Wifi, the method comprising:
   receiving, by a wireless network interface card of a master device, data related to a module device, the data comprising a media access control (MAC) address of a virtual wireless network interface card;
   determining, by the master device, a MAC address of an Ethernet interface card corresponding to the MAC address of the virtual wireless network interface card in the data comprising the MAC address of the virtual wireless network interface card according to a mapping relationship between the MAC address of the virtual wireless network interface card and the MAC address of the Ethernet interface card, encapsulating, by the master device, the data comprising the MAC address of the virtual wireless network interface card according to the determined MAC address of the Ethernet interface card, sending the encapsulated data to an Ethernet bridge of the master device, and sending, by the Ethernet bridge, the encapsulated data to each Ethernet interface card of the module device connected with the Ethernet bridge; or encapsulating, by the master device, the data comprising the MAC address of the virtual wireless network interface card according to a corresponding MAC address of each respective Ethernet interface card connected with the Ethernet bridge, and sending each encapsulated data to the corresponding Ethernet interface card via the Ethernet bridge according to the MAC address of the corresponding Ethernet interface card in the each encapsulated data;
   receiving, by the Ethernet bridge of the master device, data sent from the module device;
   sending the data received by the Ethernet bridge to the wireless network interface card; and
   sending out, by the wireless network interface card, the data received by the wireless network interface card.

2. The method of claim 1, wherein receiving, by the Ethernet bridge of the master device, the data sent from the module device, sending the data to the wireless network interface card, and sending, by the wireless network interface card, the data received, comprises:
   upon reception of data comprising a MAC address of an Ethernet interface card and a MAC address of a virtual wireless network interface card sent from the module device, decapsulating, by the Ethernet bridge of the master device, the data comprising the MAC address of the Ethernet interface card and the MAC address of the virtual wireless network interface card, obtaining data comprising the MAC address of the virtual wireless network interface card, sending the obtained data to the wireless network interface card of the master device, and sending, by the wireless network interface card, the data received by the wireless network interface card.

3. The method of claim 1, wherein receiving, by the wireless network interface card of the master device, the data related to the module device, sending the data to the Ethernet bridge of the master device, and sending, by the Ethernet bridge, the data to each Ethernet interface card of the module device, comprises:
   receiving, by the wireless network interface card of the master device, data related to a plurality of module devices from an outer network, and sending the data to corresponding module devices successively via a wireless multiplexer of the master device and the Ethernet bridge of the master device; and
   wherein receiving, by the Ethernet bridge of the master device, the data sent from the module device, sending the data received by the Ethernet bridge to the wireless network interface card, and sending, by the wireless network interface card, the data received, comprises:
   receiving, by the Ethernet bridge of the master device, the data sent from the module device, sending the data received by the Ethernet bridge to the wireless network interface card via the wireless multiplexer of the master device, and sending, by the wireless network interface card, the data received by the wireless network interface card.

4. A method for transmitting data via Wifi, the method comprising:
sending, by a virtual wireless network interface card of a module device, data of the module device to an Ethernet interface card of the module device;
sending, by the Ethernet interface card, the data of the module device to an Ethernet bridge of a first master device, so that a wireless network interface card of the master device acquires the data from the Ethernet bridge and sends out the data;
receiving, by the Ethernet interface card of the module device, data sent from the master device; and
upon reception of data comprising a MAC address of an Ethernet interface card and a MAC address of a virtual wireless network interface card sent from the master device, decapsulating, by the Ethernet interface card of the module device, the received data into data comprising the MAC address of the virtual wireless network interface card, sending the decapsulated data to the virtual wireless network interface card of the module device, upon reception of the decapsulated data by the virtual wireless network interface card of the module device, judging, by the virtual wireless network interface card, whether the MAC address of the virtual wireless network interface card in the decapsulated data is the same as a MAC address of itself, determining that the reception is successful if true, and otherwise discarding the received data comprising the MAC address of the virtual wireless network interface card; or upon reception of data comprising the MAC address of the Ethernet interface card and the MAC address of the virtual wireless network interface card sent from the master device, judging, by the Ethernet interface card of the module device, whether the MAC address of the Ethernet interface card in the received data is the same as a MAC address of itself, decapsulating the data into data comprising the MAC address of the virtual wireless network interface card, and sending the data to the virtual wireless network interface card of the module device if true, otherwise discarding the received data comprising the MAC address of the Ethernet interface card and the MAC address of the virtual wireless network interface card.

5. The method of claim 4, wherein sending, by the virtual wireless network interface card of the module device, the data of the module device to the Ethernet interface card of the module device, and sending, by the Ethernet interface card, the data of the module device to the master device, comprises:
sending, by the virtual wireless network interface card of the module device, data comprising a MAC address of the virtual wireless network interface card to the Ethernet interface card, encapsulating, by the Ethernet interface card, the data comprising the MAC address of the virtual wireless network interface card using the MAC address of the Ethernet interface card, and sending the encapsulated data to the master device, so that the master device receives the data via the Ethernet bridge, decapsulates the data into data comprising the MAC address of the virtual wireless network interface card and sends the data via the wireless network interface card.

6. A device for transmitting data via Wifi, the device comprising:
a wireless network interface card configured to receive data related to a module device from an outer network, the data comprising a media access control (MAC) address of a virtual wireless network interface card, send the received data to a wireless hotspot, and send data of the module device received from the wireless hotspot to the outer network;
an Ethernet bridge; and
a wireless hotspot configured to:
determine a MAC address of an Ethernet interface card corresponding to the MAC address of the virtual wireless network interface card in the data comprising the MAC address of the of the virtual wireless network interface card according to a mapping relationship between the MAC address of the virtual wireless network interface card and the MAC address of the Ethernet interface card, encapsulate the data comprising the MAC address of the virtual wireless network interface card according to the determined MAC address of the Ethernet interface card, and send the encapsulated data to each Ethernet interface card connected with the Ethernet bridge via the Ethernet bridge; or encapsulate the data comprising the MAC address of the virtual wireless network interface card according to a corresponding MAC address of each respective Ethernet interface card connected with the Ethernet bridge, and send each encapsulated data to the corresponding Ethernet interface card via the Ethernet bridge according to the MAC address of the corresponding Ethernet interface card in the each encapsulated data;
process the data of the module device received from the Ethernet bridge; and
send the processed data to the wireless network interface card;
the Ethernet bridge configured to receive the encapsulated data related to the module device from the wireless hotspot, send the encapsulated data to the module device, receive data from the module device, and send the data received from the module device to the wireless hotspot.

7. The device of claim 6, wherein the wireless hotspot is configured to:
receive data comprising a MAC address of a virtual wireless network interface card from the wireless network interface card, encapsulate the received data comprising the MAC address of the virtual wireless network interface card according to a MAC address of an Ethernet interface card, and send the data to the Ethernet bridge;
and upon reception of the data comprising the MAC address of the Ethernet interface card and the MAC address of the virtual wireless network interface card from the Ethernet bridge, decapsulate the received data comprising the MAC address of the Ethernet interface card and the MAC address of the virtual wireless network interface card, and obtain and send the data of the module device comprising the MAC address of the virtual wireless network interface card to the wireless network interface card.

8. The device of claim 6, further comprising:
a wireless multiplexer configured to send data related to a plurality of module devices received from the wireless network interface card to the wireless hotspot, and send data of a plurality of module devices received from the wireless hotspot to the wireless network interface card.

9. A module device for transmitting data via Wifi, the module device comprising:
an Ethernet interface card; and
a virtual wireless network interface card configured to send data of the module device to the Ethernet interface card, and receive data related to the module device sent from the Ethernet interface card;
the Ethernet interface card configured to:
  receive the data of the module device from the virtual wireless network interface card, send the received data to a master device, receive the data related to the module device from the master device, and send the data to the virtual wireless network interface card;
  encapsulate data comprising a media access control (MAC) address of the virtual wireless network interface card sent from the virtual wireless network card, send the encapsulated data comprising the MAC address of the Ethernet interface card and the MAC address of the virtual wireless network interface card to the master device, decapsulate the data comprising the MAC address of the Ethernet interface card and the MAC address of the virtual wireless network interface card received from the master device, and send the decapsulated data comprising the MAC address of the virtual wireless network interface card to the virtual wireless network interface card; and
  upon reception of the data containing a MAC address of the Ethernet interface card and the MAC address of the virtual wireless network interface card from the master device, decapsulate the data into data comprising the MAC address of the virtual wireless network interface card, and send the decapsulated data to the virtual wireless network interface card;
the virtual wireless network interface card configured to:
  encapsulate the data of the module device into data comprising the MAC address of the virtual wireless network interface card and then send the data to the Ethernet interface card, and
  upon reception of the data comprising the MAC address of the virtual wireless network interface card from the Ethernet interface card, judge whether the MAC address of the virtual wireless network interface card in the data is the same as the MAC address of the virtual wireless network interface card to which it corresponds, determine that the reception is successful if true, and otherwise discard the received data comprising the MAC address of the virtual wireless network interface card.

10. The module device of claim 9, wherein the Ethernet interface card is configured to:
receive the data comprising the MAC address of the Ethernet interface card and the MAC address of the virtual wireless network interface card from the master device, judge whether the MAC address of the Ethernet interface card in the data is the same as the MAC address of itself, decapsulate the data and send the decapsulated data comprising the MAC address of the virtual wireless network interface card to the virtual wireless network interface card if true, and otherwise discard the received data comprising the MAC address of the Ethernet interface card and the MAC address of the virtual wireless network interface card; and
the virtual wireless network interface card is configured to receive the data comprising the MAC address of the virtual wireless network interface card from the Ethernet interface card.

* * * * *